United States Patent [19]

Fair et al.

[11] Patent Number: 4,967,091

[45] Date of Patent: Oct. 30, 1990

[54] REFLECTIVE PICTURE GENERATOR

[75] Inventors: Martin L. Fair; John C. Roberts, both of Bristol, United Kingdom

[73] Assignee: British Aerospace Public Limited Company, London, England

[21] Appl. No.: 269,039

[22] Filed: Nov. 9, 1988

[30] Foreign Application Priority Data

Nov. 9, 1987 [GB] United Kingdom ............... 8726184

[51] Int. Cl.⁵ .............................................. F41V 2/00
[52] U.S. Cl. ............................. 250/504 R; 250/494.1; 250/495.1; 250/252.1; 434/21; 273/348.1
[58] Field of Search ............ 250/504 R, 495.1, 503.1, 250/494.2, 252; 434/21; 273/348.1

[56] References Cited

U.S. PATENT DOCUMENTS 4,279,599  7/1981  Marshall et al. ................. 273/348.1
4,605,232  8/1986  Hundstad ......................... 273/348.1

*Primary Examiner*—Jack I. Berman
*Attorney, Agent, or Firm*—Cushman, Darby & Cushman

[57] ABSTRACT

Apparatus for testing and/or calibrating a detector comprising a latent image generator, the generator having differing reflectance coefficients across its surface such that in use, when irradiated by collimated radiation the output intensity from some regions is relatively high and from other regions is relatively low.

5 Claims, 3 Drawing Sheets

REFLECTIVE PICTURE GENERATOR

BACKGROUND OF THE INVENTION

1. Field of the Invention

This invention relates to apparatus for testing and/or calibrating a detector such as a thermal imaging device which may be attached to a missile or other projectile.

2. Description of the Prior Art

It has been proposed to test the imaging capabilities of a thermal imager by providing standard test scene plates for different test wavelengths. This technique is somewhat limited in that the test scene plates have to be changed for different wavelength ranges, which may impart a non-uniformity in the testing of the thermal imager.

It has also been proposed to test thermal imagers in situ in the field, this is also not wholly satisfactory. At different times of the day slight differences in conditions would render comparison of a number of thermal imagers inaccurate.

A third proposal has been to simulate a scene either by computer or electronically. As this requires a plurality of individually controlled elements it has proved both complex and costly.

SUMMARY OF THE INVENTION

On object of this invention is to provide a cheap, simple device which will allow a reproducible consistant image or scene to be used at any wavelength. This would give rise to a good control to be used reliably with any thermal imager, at any time.

According to one aspect of the invention there is provided apparatus for testing and/or calibrating a detector comprising a latent image generator, the generator having differing reflectance coefficients across its surface such that in use, when irradiated by collimated radiation the output intensity from some regions is relatively high and from other regions is relatively low. In other words no unintended radiation is detectable from an unilluminated image generator.

Preferably said latent image generator is a specular metal plate with a scene or landscape etched upon it such that the etched and non-etched portions give rise to respective relatively low and relatively high outputs of detectable radiation.

Preferably said optical means to direct radiation from a source onto said generator and from said generator onto the detector to be tested, comprises two concave collimating mirrors.

Advantageously said etched plate may form part of a rotatable drum.

Advantageously said generator should be suitably cooled to prevent excessive black body radiation at wavelengths within the test range of the detector.

BRIEF DESCRIPTION OF THE DRAWING

Reference will now be made, by way of example, to the accompanying drawings, in which.

(a) specular reflection in a plane plate;

(b) diffused reflection in a completely pitted plate; and, (c) 'frustrated' reflection to an etched plate.

DETAILED DESCRIPTION OF THE PRESENTLY PREFERRED EXEMPLARY EMBODIMENT

Figure 1:
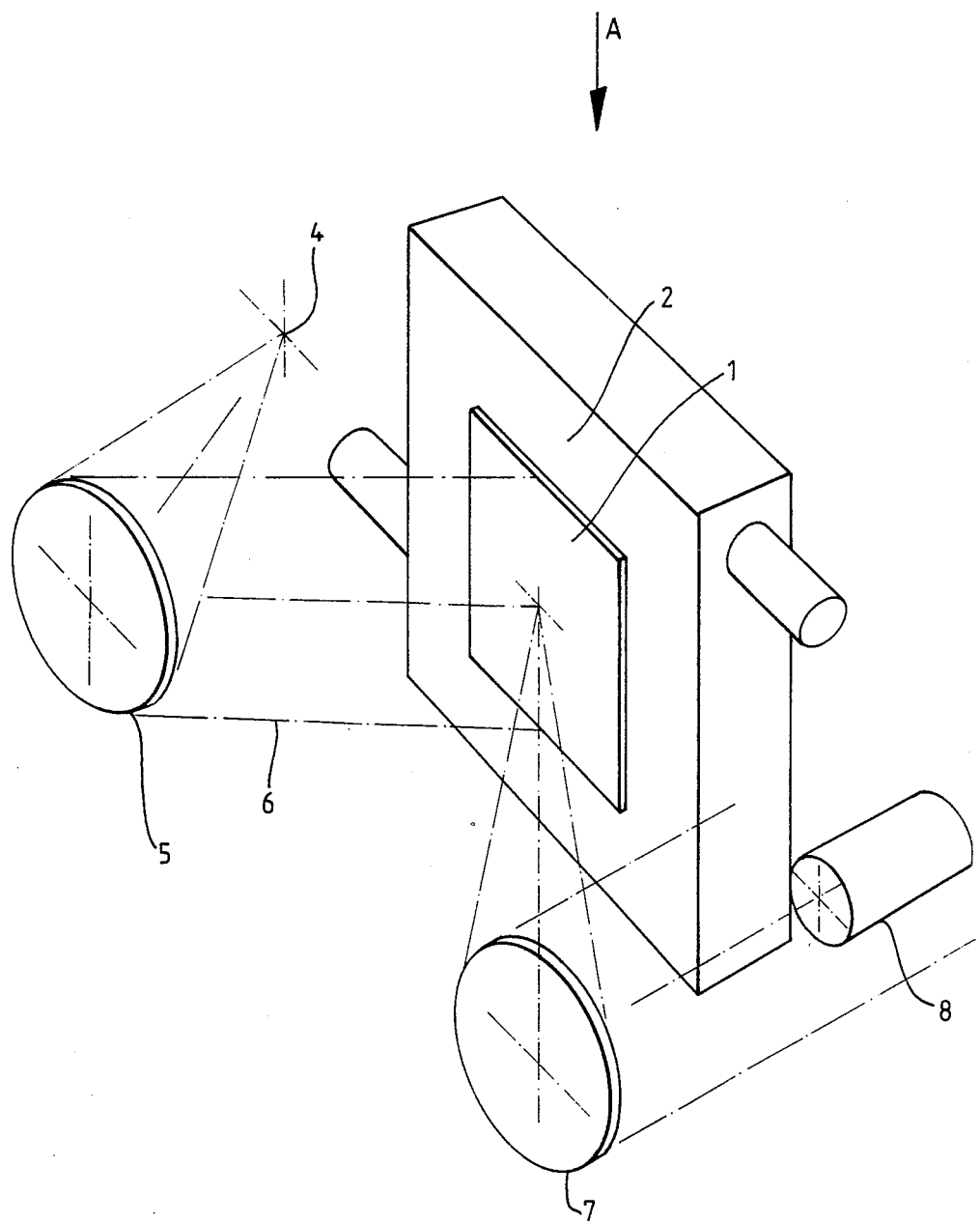
FIG. 1 is a perspective view of apparatus for testing and for calibrating detectors.
Figure 2:
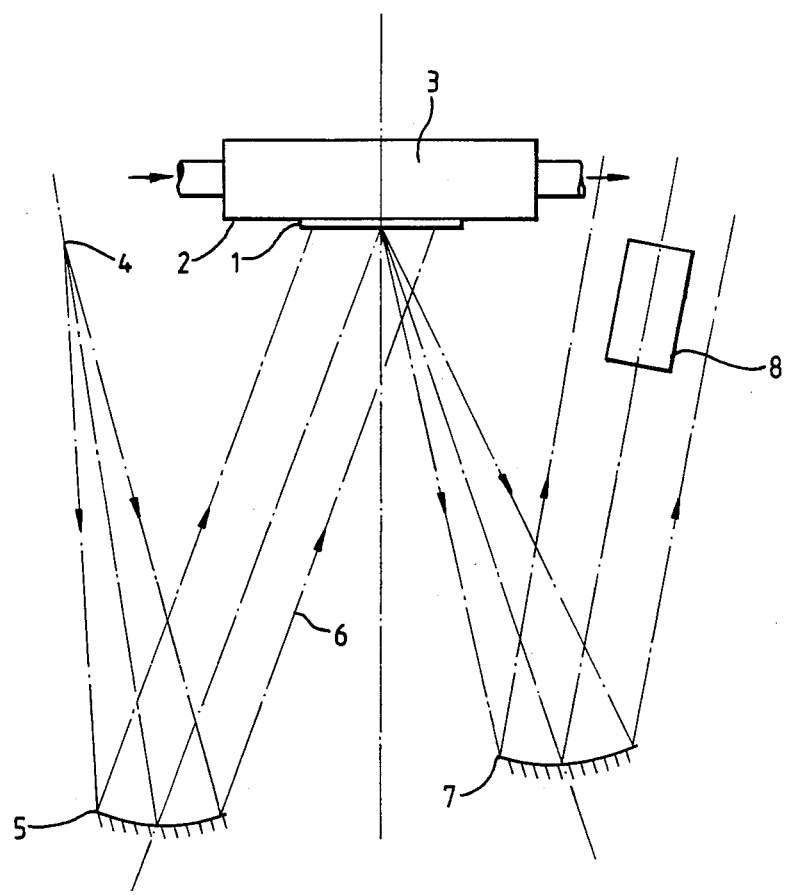
FIG. 2 is a diagram of the device, in the general direction of Arrow A of FIG. 1.

Referring to FIGS. 1 and 2, a polished metal plate 1, suitably etched, is mounted on a cool surface 2. The metal plate is etched with a landscape scene, for example, the scene being formed by a plurality of pits 9 shown in FIGS. 3(b) and 3(c) in the plate 1. In this embodiment the cool surface is one face of a chamber 3. Fluid is passed through the chamber in order to absorb heat from surface 2 and then dissipate it elsewhere.

Figure 3:
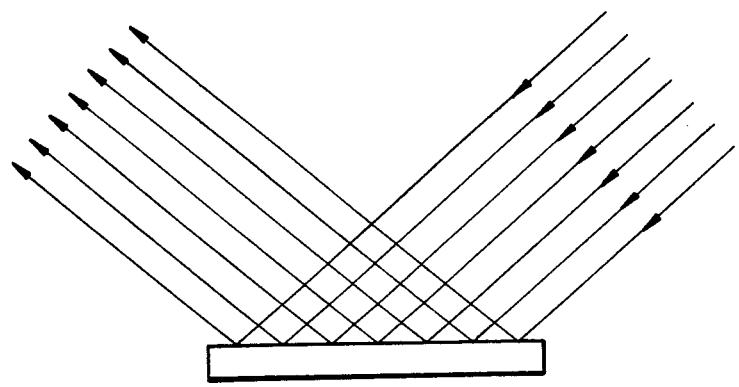
FIG. 3 illustrates three different types of reflection from different surfaces, i.e.
Figure 3:
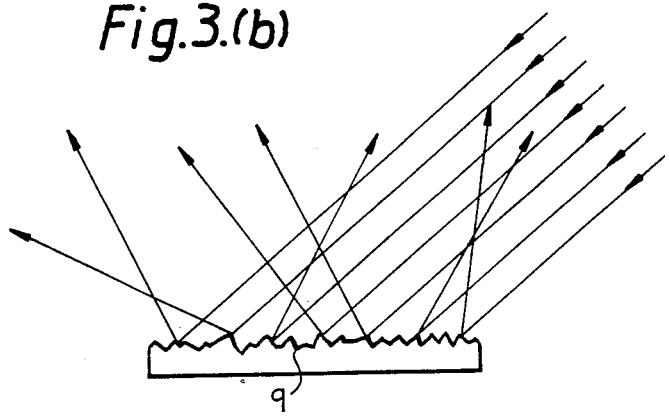
Figure 3:
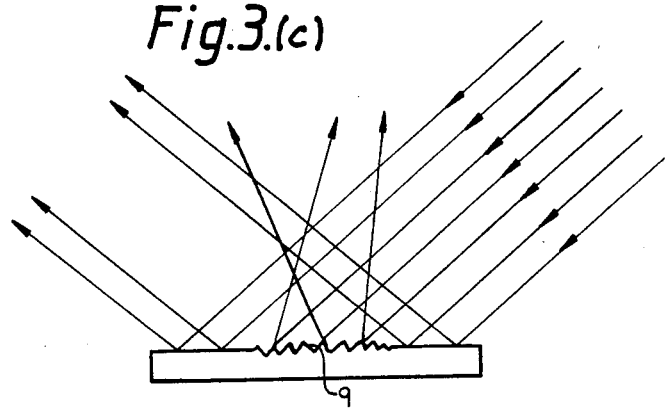

A primary source of radiation 4 (for example a light bulb, IR source etc.) impinges on a concave mirror 5 such that a collimated beam of radiation 6 illuminates the etched plate. The radiation is reflected from the specular part of the plate and scattered by the pits forming the etching, as illustrated in FIGS. 3(a), 3(b) and 3(c). The radiation reflected from the surface is scattered at different angles giving a polar distribution of reflectance. If the size of the pits 9 of the plate are approximately equal to the wavelength of the radiation then the polar distribution is equivalent to a Gaussian distribution. The radiation reflected from the plate is re-collimated by a second concaved mirror 7, in order to produce an intense image of the scene at the detector 8, to be tested. By slightly tilting the etched plate 1 the scattered radiation illuminates the mirror 7, giving rise to a low intensity negative contrast picture being detected at detector 8. Movement of the plate 1 within its own plane, simulates the detector under examination scanning the generated scene. In one embodiment of the present invention this could be achieved by mounting the plate on a rotatable drum (not shown).

The above system is for use typically, though not exclusively, with wavelengths ranging from far UV to far IR. The cooling surface 2 is used throughout this range, although it is only critical that it should be used for wavelengths from middle to far IR. This is due to the fact that articles at room temperature, or thereabouts, will naturally radiate in the middle to far IR wavelengths, (cf black body radiation laws) by cooling the articles, the radiation received from the collimated source which partly serves to heat up the articles will be dissipated away, hence producing the 'noise'.

It should be noted that any forms of collimating means may be used rather than mirrors, e.g. lenses, however the spectral limitation of transmission optics restricts the wavelength that can be covered by the apparatus.

We claim:

1. Apparatus for testing and/or calibrating a detector comprising a latent image generator, which generator comprises a specular metal plate with a scene or landscape etched upon it such that the etched and non-etched portions, having differing reflective co-efficients, give rise to respective relatively low and relatively high outputs of detection radiation when irradiated by collimated radiation; and optical means for directing radiation from a source onto said image generator and from said image generator onto a detector to be tested, which optical means comprises two concave collimating mirrors.

2. Apparatus for testing and/or calibrating a detector according to claim 1, wherein said image generator is cooled to reduce undesired black body radiation at wavelengths within the test range of the detector.

3. Apparatus for testing and/or calibrating a detector according to claim 1, wherein said etched plate forms part of a rotatable drum.

4. Apparatus for testing and/or calibrating a detector according to claim 3, wherein said image generator is cooled to reduce undesired black body radiation at wavelengths within the test range of the detector.

5. Apparatus for testing and/or calibrating a detector comprising a latent image generator, which generator comprises a specular metal plate with a scene or landscape etched upon it such that the etched and non-etched portions, having differing reflective co-efficients, give rise to respective relatively low and relatively high outputs of detection radiation when irradiated by collimated radiation; and optical means for directing radiation from a source onto said image generator and from said image generator onto a detector to be tested, which optical means comprises two concave collimating lenses.

* * * * *